(12) United States Patent
Endo et al.

(10) Patent No.: US 8,402,790 B2
(45) Date of Patent: Mar. 26, 2013

(54) PROCESS FOR PRODUCING GLASS SUBSTRATE FOR INFORMATION RECORDING MEDIUM

(75) Inventors: Jun Endo, Chiyoda-ku (JP); Tetsuya Nakashima, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 91 days.

(21) Appl. No.: 12/909,423

(22) Filed: Oct. 21, 2010

(65) Prior Publication Data

US 2011/0123710 A1 May 26, 2011

(30) Foreign Application Priority Data

Nov. 24, 2009 (JP) .................. 2009-266482

(51) Int. Cl.
*G11B 5/84* (2006.01)
*C03B 25/00* (2006.01)
*G11B 5/62* (2006.01)

(52) U.S. Cl. ............. 65/404; 65/117; 65/29.19; 65/95; 360/135; 428/846.9

(58) Field of Classification Search ............ 501/66, 501/67, 50, 51, 52, 53, 64, 65, 68, 69, 70, 501/73; 257/794; 65/95, 29.19, 30.14, 96, 65/134.9, 404, 117; 428/846.9, 428, 1.1, 428/1.32, 1.62, 34, 426, 220; 360/135; 427/128
See application file for complete search history.

(56) References Cited

U.S. PATENT DOCUMENTS

| | | |
|---|---|---|
| 6,294,490 B1 | 9/2001 | Zou et al. |
| 6,569,792 B2 | 5/2003 | Zou et al. |
| 6,774,072 B2 | 8/2004 | Zou et al. |
| 6,960,399 B2 | 11/2005 | Zou et al. |
| 7,264,894 B2 | 9/2007 | Zou et al. |
| 7,601,446 B2 | 10/2009 | Ikenishi et al. |
| 7,703,303 B2 | 4/2010 | Isono et al. |
| 2002/0028740 A1 | 3/2002 | Zou et al. |
| 2003/0171201 A1 | 9/2003 | Zou et al. |
| 2004/0241455 A1 | 12/2004 | Zou et al. |
| 2005/0162956 A1 | 7/2005 | Ikenishi et al. |
| 2005/0284179 A1 | 12/2005 | Isono et al. |
| 2006/0040142 A1 | 2/2006 | Zou et al. |
| 2006/0119249 A1 | 6/2006 | Miyata et al. |
| 2007/0015651 A1* | 1/2007 | Endo ................. 501/50 |
| 2008/0076656 A1* | 3/2008 | Suzuki et al. ............. 501/53 |
| 2008/0127679 A1* | 6/2008 | Nishizawa et al. ......... 65/134.9 |
| 2008/0128923 A1* | 6/2008 | Saito et al. ............... 257/794 |
| 2009/0139268 A1* | 6/2009 | Fujiwara et al. ............ 65/404 |
| 2009/0176038 A1* | 7/2009 | Komori et al. ............. 428/1.1 |
| 2009/0176640 A1* | 7/2009 | Maehara et al. ........... 501/66 |
| 2009/0220761 A1* | 9/2009 | Dejneka et al. ............ 65/30.14 |
| 2009/0220824 A1* | 9/2009 | Ikenishi et al. ............ 428/846.9 |
| 2009/0226733 A1* | 9/2009 | Kato et al. ................ 428/428 |
| 2009/0270242 A1* | 10/2009 | Yanase et al. ............. 501/67 |
| 2010/0255350 A1 | 10/2010 | Endo et al. |
| 2010/0269542 A1* | 10/2010 | Nishiura et al. ............ 65/95 |

FOREIGN PATENT DOCUMENTS

| | | |
|---|---|---|
| EP | 0 634 374 A1 | 1/1995 |
| JP | 58-114037 | 7/1983 |
| JP | 5-32431 | 2/1993 |
| JP | 10-53426 | 2/1998 |
| JP | 2001-172043 | 6/2001 |
| JP | 2002-29774 | 1/2002 |
| WO | WO 2008/117758 A1 | 10/2008 |

OTHER PUBLICATIONS

U.S. Appl. No. 12/959,726, filed Dec. 3, 2010, Endo, et al.
U.S. Appl. No. 12/909,221, filed Oct. 21, 2010, Endo, et al.
U.S. Appl. No. 13/271,322, filed Oct. 12, 2011, Endo, et al.

\* cited by examiner

*Primary Examiner* — Kevin M. Bernatz
*Assistant Examiner* — Louis Falasco
(74) *Attorney, Agent, or Firm* — Oblon, Spivak, McClelland, Maier & Neustadt, L.L.P.

(57) ABSTRACT

To provide a process to improve acid resistance of a glass substrate for an information recording medium.

A process for producing a glass substrate for an information recording medium, comprising processing a glass formed into a plate by a float process, a down-draw method or a press method, wherein, in cooling of the glass in the last step where the glass has a temperature of at least its strain point, the time during which the glass temperature is at least its strain point and at most a temperature where the glass viscosity is $10^{10}$ dPa·s is at least 13 minutes.

13 Claims, No Drawings

PROCESS FOR PRODUCING GLASS SUBSTRATE FOR INFORMATION RECORDING MEDIUM

TECHNICAL FIELD

The present invention relates to a glass substrate to be used for an information recording medium such as a magnetic disk (hard disk), and a magnetic disk.

BACKGROUND ART

As substrates for information recording media, particularly for magnetic disks, glass substrates are widely used, and, for example, a glass containing, as represented by mass %, from 47 to 60% of $SiO_2$, from 8 to 20% of $Al_2O_3$, from 2 to 8% of $Na_2O$, from 1 to 15% of $K_2O$, from 1 to 6% of $TiO_2$ and from 1 to 5% of $ZrO_2$ has been proposed.
Patent Document 1: WO 08/117,758

DISCLOSURE OF THE INVENTION

Problems to be Solved by the Invention

A glass substrate for a magnetic disk is required to have an appropriate expansion coefficient and Young's modulus, and further, it is required to have acid resistance because acids are used during a polishing step and a washing step in the production process. Further, there has been a case where an acid having a low pH is used in order to improve the polishing rate or improve defect-removing performance in a washing step. However, for a glass having a low acid resistance, only an acid having a high pH may be used, whereby there has been a problem such that the polishing rate or defective quality after washing cannot be improved.

An object of the present invention is to provide a process by which a glass substrate for a magnetic disk can have improved acid resistance.

Means to Solve the Problems

The present invention provides a process for producing a glass substrate for an information recording medium, comprising processing a glass formed into a plate by a float process, a down-draw method or a press method, wherein, in cooling of the glass in the last step where the glass temperature becomes at least its strain point, the time during which the glass temperature is at least its strain point and at most a temperature where the glass viscosity becomes $10^{10}$ dPa·s becomes at least 13 minutes.

Further, the present invention provides the process for producing a glass substrate for an information recording medium, wherein the glass is an alkali aluminosilicate glass.

Further, the present invention provides the process for producing a glass substrate for an information recording medium, wherein the alkali alminosilicate glass has an alkali metal oxide content of from 15 to 26 mol %.

Further, the present invention provides the process for producing a glass substrate for an information recording medium, which comprises from 64 to 67% of $SiO_2$, from 8 to 10% of $Al_2O_3$, from 10 to 13% of $Li_2O$, from 9 to 12% of $Na_2O$, from 0 to 2% of $K_2O$ and from 2 to 4% of $ZrO_2$, provided that the total content of $Li_2O$, $Na_2O$ and $K_2O$, i.e. $Li_2O+Na_2O+K_2O$, is from 21 to 25%. For example, "comprises . . . from 0 to 2% of $K_2O$" means that $K_2O$ is not essential but may be contained in an amount of at most 2%.

Further, the present invention provides a process for producing a magnetic disk having a magnetic recording layer formed on such a glass substrate for an information recording medium produced by the process as defined above.

The acid resistance of a glass substrate for an information recording medium depends mainly on its glass composition, but the present inventors have found that acid resistance can be improved by controlling its temperature history even with the same glass composition, and they have thus arrived at the present invention.

Effects of the Invention

According to the present invention, the acid resistance of a glass substrate for an information recording medium can be improved, and an acid having a low pH can be used during a polishing step and a washing step in the production process. Further, as a result, the polishing rate or defective quality after washing can be improved

BEST MODE FOR CARRYING OUT THE INVENTION

The density d of the glass (hereinafter referred to as the glass of the present invention) of the glass substrate for an information recording medium of the present invention (hereinafter referred to as the glass substrate of the present invention) produced by the process for producing a glass substrate for an information medium (hereinafter referred to as the production process of the present invention) is preferably at most 2.60 g/cm³. If it exceeds 2.60 g/cm³, a load is applied to a motor during rotation of a drive, and thus it is possible that the power consumption is increased or rotation of the drive becomes unstable. It is preferably at most 2.54 g/cm³.

The glass of the present invention preferably has a Young's modulus E of at least 76 GPa. If it is less than 76 GPa, warpage or deflection is likely to occur during rotation of the drive, and it may possibly become difficult to obtain an information recording medium having a high recording density. E is more preferably at least 77 GPa.

The glass of the present invention preferably has a specific modulus E/d of at least 28 MNm/kg. If E/d is less than 28 MNm/kg, warpage or deflection is likely to occur, and it may possibly be difficult to obtain an information recording medium having a high recording density. E/d is more preferably at least 30 MNm/kg.

The glass of the present invention preferably has a glass transition point $T_g$ of at least 450° C. If it is less than 450° C., the magnetic layer forming-heat processing temperature cannot be made sufficiently high, and it may possibly be difficult to increase the coercive force of the magnetic layer. It is more preferably at least 460° C.

The glass of the present invention preferably has an average linear expansion coefficient α of at least $56 \times 10^{-7}$/° C. within a range of from −50 to 70° C. If it is less than $56 \times 10^{-7}$/° C., the difference from the thermal expansion coefficient of another component such as a drive made from a metal becomes large, and thus a substrate may possibly be easily broken due to generation of a stress at the time of a temperature change. It is more preferably at least $58 \times 10^{-7}$/° C. α is typically at most $100 \times 10^{-7}$/° C.

Next, the glass of the present invention will be described using a content represented by mole percentage.

The glass of the present invention is an alkali aluminosilicate glass, and typically, it has a $SiO_2$ content of from 61 to 71%, an $Al_2O_3$ content of from 7 to 17% and an alkali metal oxide content of from 15 to 26%.

If $SiO_2$ is less than 61%, the acid resistance will be decreased, d will become large, or the liquid phase temperature will be raised, and the glass will become unstable. If it exceeds 71%, temperature $T_2$ where the viscosity becomes $10^2$ dPa·s and temperature $T_4$ where the viscosity becomes $10^4$ dPa·s will be raised, and melting and forming of the glass will be difficult, E or E/d will be decreased, or a will become small.

If $Al_2O_3$ is less than 7%, the weather resistance will be decreased, E or E/d will be decreased, or $T_g$ will be lowered. If it exceeds 17%, the acid resistance will be decreased, $T_2$ and $T_4$ will be raised, and thus melting and forming of the glass will be difficult, α will become small, or the liquid phase temperature will be too high.

As the alkali metal oxide, $Li_2O$, $Na_2O$ or $K_2O$ is common, but if the total content of alkali metal oxides is less than 15%, α will become small, or melting performance of the glass will be declined. If it exceeds 26%, the weather resistance will be decreased.

It is preferred that $Li_2O$ is from 6 to 16%, $Na_2O$ is from 2 to 13%, and $K_2O$ is from 0 to 8%.

If $Li_2O$ is less than 6%, it may be possible that α becomes small, or melting performance of the glass will be declined. If it exceeds 16%, the weather resistance or $T_g$ may possibly be decreased.

If $Na_2O$ is less than 2%, it may be possible that α becomes small, or melting performance of the glass will be declined. If it exceeds 13%, the weather resistance or $T_g$ may possibly be decreased.

$K_2O$ is not essential, but may be contained in an amount of at most 8% in order to increase α or improve the melting performance of the glass. If it exceeds 8%, it may be possible that the weather resistance is decreased, or E or E/d will be decreased.

This alkali aluminosilicate glass may contain components other $SiO_2$, $Al_2O_3$ and alkali metal oxides in an amount within a range not to impair the properties as a substrate for an information recording medium, but the content of such components is typically at most 8% in total.

As one of preferred embodiments of the glass of the present invention, a glass comprising from 64 to 67% of $SiO_2$, from 8 to 10% of $Al_2O_3$, from 10 to 13% of $Li_2O$, from 9 to 12% of $Na_2O$, from 0 to 2% of $K_2O$ and from 2 to 4% of $ZrO_2$, provided that the total content of $Li_2O$, $Na_2O$ and $K_2O$, i.e. $Li_2O+Na_2O+K_2O$ (hereinafter referred to as $R_2O$), is from 21 to 25%, may be mentioned (this glass will hereinafter be referred to as glass A of the present invention).

Next, the composition of glass A of the present invention will be described $SiO_2$ is a component to form the skeleton of the glass and is essential. If it is less than 64%, the acid resistance will be decreased, d will become large, or the liquid phase temperature will be raised and the glass will become unstable. If it exceeds 67%, $T_2$ and $T_4$ will be raised and melting and forming of the glass will become difficult, E or E/d will be decreased, or a will become small.

$Al_2O_3$ has an effect to increase weather resistance, and is essential. If it is less than 8%, such an effect will be small, E or E/d will be decreased, or $T_g$ will be lowered. If it exceeds 10%, the acid resistance will be decreased, $T_2$ and $T_4$ will be raised and melting and forming of the glass will become difficult, α will become small or the liquid phase temperature will be too high.

$Li_2O$ has an effect to increase E, E/d or α, or to improve the melting performance of the glass, and is essential. If it is less than 10%, such an effect will be small. If it exceeds 13%, the weather resistance will be decreased, or $T_g$ will be lowered.

$Na_2O$ has an effect to increase a or to improve melting performance of the glass, and is essential. If it is less than 9%, such an effect will be small. If it exceeds 12%, the weather resistance will be decreased, or $T_g$ will be lowered.

$K_2O$ is not essential, but it has an effect to increase α, or to improve melting performance of the glass, and it may be contained in an amount of at most 2%. If it exceeds 2%, the weather resistance will be decreased, or E or E/d will be decreased. In the case where $K_2O$ is contained, its content is preferably at least 0.1%.

If the total content of the above $R_2O$ is less than 21%, a will become small, or the melting performance of the glass will be declined. If $R_2O$ exceeds 25%, the weather resistance will be decreased.

$ZrO_2$ has an effect to increase E, E/d or $T_g$, to increase the weather resistance or to improve melting performance of the glass, and thus it is essential. If it is less than 2%, such an effect will be small. If it exceeds 4%, it may be possible that d becomes large or the liquid phase temperature becomes too high.

The glass of the present invention consists essentially of the above components, but it may contain other components within a range not to impair the object of the present invention. In such a case, the content of the other components is, in total, preferably at most 2%, more preferably at most 1%, particularly preferably at most 0.5%.

Next, examples of components other than the above components will be described.

MgO is not essential, but it has an effect to increase E, E/d or α, to make the glass being hardly scratched, or to improve melting performance of the glass, while maintaining the weather resistance, and it may be contained in an amount of at most 2%. If it exceeds 2%, the liquid phase temperature will be too high. It is more preferably at most 1%, particularly preferably at most 0.5%. No MgO is typically contained.

CaO is not essential, but it has an effect to increase a or to improve melting performance of the glass, while maintaining the weather resistance, and it may be contained in an amount of at most 2%. If it exceeds 2%, it may be possible that d becomes large, E is decreased, or the liquid phase temperature becomes too high. It is more preferably at most 1%, particularly preferably at most 0.5%. No CaO is typically contained.

SrO may be contained in an amount of at most 2% in order to increase a or to improve melting performance of the glass. If it exceeds 2%, it may be possible that d becomes large or the glass becomes likely to be scratched. It is more preferably at most 1%, particularly preferably at most 0.5%. No SrO is typically contained.

BaO may be contained in an amount of at most 2% in order to increase a or to improve melting performance of the glass. If it exceeds 2%, it may be possible that d becomes large or the glass becomes likely to be scratched. It is more preferably at most 1%, particularly preferably at most 0.5%. No BaO is typically contained.

$TiO_2$ may be contained in an amount of less than 2% in order to increase E, E/d or $T_g$, to increase weather resistance, etc. If it is 2% or more, $T_L$ may possibly be too high, or phase separation may possibly be likely to occur. It is more preferably at most 1%, particularly preferably at most 0.5%. No $TiO_2$ is typically contained.

$B_2O_3$ may be contained in an amount of at most 2% in order to increase E or E/d, to increase weather resistance, to improve melting performance of the glass, etc. If it exceeds 2%, phase separation may possibly be likely to occur. It is more preferably at most 1%, particularly preferably at most 0.5%. No $B_2O_3$ is typically contained.

$La_2O_3$ may be contained in order to e.g. improve E while maintaining the weather resistance, but in such a case, it is preferably at most 2%. If it exceeds 2%, it may be possible that d becomes large or the liquid phase temperature becomes too high. It is more preferably at most 1%, particularly preferably at most 0.5%. No $La_2O_3$ is typically contained.

$Nb_2O_5$ may be contained in order to e.g. improve E while maintaining the weather resistance, but in such a case, it is preferably at most 2%. If it exceeds 2%, it may be possible that d becomes large or the liquid phase temperature becomes too high. It is more preferably at most 1%, particularly preferably at most 0.5%. No $Nb_2O_5$ is typically contained.

$RE_2O_3$ may be contained in an amount of less than 1% in total. The $RE_2O_3$ represents an oxide of a rare earth selected from the group consisting of Sc, Y, La, Ce, Pr, Nd, Sm, Eu, Gd, Tb, Dy, Ho, Er, Tm, Yb and Lu, and a mixture thereof.

A clarifier such as $SO_3$, Cl, $As_2O_3$, $Sb_2O_3$ or $SnO_2$ maybe contained in an amount of up to 2% in total.

A colorant such as $Fe_2O_3$, $CO_3O_4$ or NiO may be contained in an amount of up to 2% in total.

Another preferred embodiment of the glass of the present invention may be, for example, one which contains from 64 to 69% of $SiO_2$, from 9 to 11% of $Al_2O_3$, from 6 to 9% of $Li_2O$, from 9 to 13% of $Na_2O$, from 0 to 2% of $K_2O$, from 0 to 4% of MgO, from 1 to 5% of CaO and from 0 to 2% of $ZrO_2$, provided that $R_2O$ is from 16 to 20%; one which contains from 66 to 71% of $SiO_2$, from 7 to 9% of $Al_2O_3$, from 0 to 3% of $B_2O_3$, from 12 to 16% of $Li_2O$, from 2 to 5% of $Na_2O$, from 0 to 3% of $K_2O$, from 0 to 5% of MgO, from 0 to 3% of $TiO_2$, from 0 to 2% of $ZrO_2$, from 0 to 2% of $La_2O_3$ and from 0 to 2% of $Nb_2O_5$, provided that $R_2O$ is from 16 to 21%; and one which contains from 61 to 66% of $SiO_2$, from 11.5 to 17% of $Al_2O_3$, from 8 to 16% of $Li_2O$, from 2 to 8% of $Na_2O$, from 2.5 to 8% of $K_2O$, from 0 to 6% of MgO, from 0 to 4% of $TiO_2$ and from 0 to 3% of $ZrO_2$, provided that $Al_2O_3+MgO+TiO_2$ is at least 12% and $R_2O$ is from 16 to 23%, and that the content of $B_2O_3$ is less than 1% if it is contained.

The glass plate of the present invention is typically a circular glass plate.

The acid resistance of the glass substrate of the present invention is evaluated by $A_{Total}$ (unit: $nmol/cm^2$) which is the sum of five kinds of acid resistance indexes $A_{Si}, A_{Al}, A_{Li}, A_{Na}$ and $A_{Zr}$ (unit: $nmol/cm^2$), which are measured as follows. A sample for the measurement which is a glass plate having a thickness of 1 mm and a size of 4 cm square and having both surfaces mirror-polished using cerium oxide was prepared and immersed in a nitric acid of 0.01 N at 25° C. for 3 hours, and it was analyzed by ICP mass analysis method to measure elution amounts of Si, Al, Li, Na and Zr, in the nitric acid. These elution amounts are divided by the surface area of the glass plate to obtain $A_{Si}, A_{Al}, A_{Li}, A_{Na}$ and $A_{Zr}$, and their sum $A_{Si}+A_{Al}+A_{Li}+A_{Na}+A_{Zr}$ is defined as $A_{Total}$.

The difference obtained by subtracting the glass transition temperature $T_g$ from the fictive temperature $T_f$, i.e. $T_f-T_g$, of the glass substrate of the present invention is preferably at most 5° C. in order to improve the weather resistance. If it exceeds 5° C., the effect to improve weather resistance will be hardly obtained. $T_f-T_g$ is preferably at most −10° C., but if it is at most −25° C., this effect will be more distinct. $T_f-T_g$ is typically at least −35° C.

In a case where the glass of the present invention is the above glass A, $A_{Total}$ of the glass substrate of the present invention is preferably at most 20.5 $nmol/cm^2$. If a glass substrate is not such a one, when a strong acidic liquid having a pH of from 1 to 2 is used in a surface polishing or final washing step during the production of a glass substrate for an information recording medium, particularly a glass substrate for a magnetic disk, it may possibly cause roughness at the glass surface or peel cracking. $A_{Total}$ is more preferably at most 20 $nmol/cm^2$.

The glass substrate of the present invention is typically used as a glass substrate for a magnetic disk.

Glass substrates for magnetic disks are widely used for 2.5-inch substrates (outside diameter of a glass substrate: 65 mm) used for e.g. notebook PCs, 1.8-inch substrates (outside diameter of a glass substrate: 48 mm) used for e.g. portable MP3 players and so on. Their market is growing every year, and on the other hand, they are desired to be supplied at a low price. Glass used for such glass substrates is preferably suitable for mass production.

In the production process of the present invention, a press method as well as a down-draw method such as a fusion method and a continuous molding method called a float process are used. The glass of the present invention includes a glass which is able to be formed by e.g. a float process and thus it is suitable for mass production.

In the production process of the present invention, the melting and forming method of a glass is not particularly limited, and various methods can be applied. For example, materials for the respective components commonly used are blended to have a desired composition, and such a mixture is heated and melted in a glass melting furnace. Then, the glass is homogenized by e.g. bubbling, stirring or addition of a clarifier, followed by forming into a plate glass having a predetermined thickness by a known method such as a down-draw method including a fusion method, a float process or a press method, and then, after annealing, processing such as grinding or polishing is carried out as necessary, to obtain a glass substrate having prescribed size and shape.

In the production process of the present invention, in cooling of the glass in the last step where the glass temperature becomes at least its strain point, the time t during which the glass temperature is at least its strain point and at most a temperature where the glass viscosity becomes $10^{10}$ dPa·s is permitted to be at least 13 minutes. If the time t is less than 13 minutes, it may be possible that it becomes difficult to bring the above $T_f-T_g$ to at most 5° C. It is more preferably at least 18 minutes.

EXAMPLES

Materials were prepared so that a glass having a composition comprising, as represented by mol %, 65.7% of $SiO_2$, 8.5% of $Al_2O_3$, 12.4% of $Li_2O$, 10.9% of $Na_2O$ and 2.5% of $ZrO_2$ would be obtained, and they were melted at a temperature of from 1,550 to 1,600° C. for 3 to 5 hours using a platinum crucible. In the melting, a platinum stirrer was put into the molten glass, and the glass was stirred for 2 hours to be homogenized. Then, the molten glass was cast to form a plate and annealed to room temperature at a cooling rate of 1° C./min.

Thus obtained plate glass had a density d of 2.51 $g/cm^3$, an average linear expansion coefficient α of $77 \times 10^{-7}$/° C., a Young's modulus E of 84 GPa, a specific modulus E/d of 33.7 MNm/kg, a glass transition point $T_g$ of 494° C., a fictive temperature $T_f$ of 478° C., a strain point $T_{Str}$ of 457° C. at which the glass viscosity becomes $10^{14.5}$ dPa·s and a temperature $T_{10}$ of 580° C. at which the glass viscosity becomes $10^{10}$ dPa·s. These measurements were carried out by the methods described below.

d: d was measured by an Archimedes method using from 20 to 50 g of a glass having no bubble in it.

α: By means of a differential thermal dilatometer and using quartz glass as a reference sample, the rate of elongation of a glass when it was heated at a rate of 5° C./min from room temperature to a temperature at which the glass is softened and elongation is no longer observed, i.e. to an yield point, was measured, and from the obtained thermal expansion curve, an average linear expansion coefficient within a range of −50 to 70° C. was calculated.

E: With respect to a glass plate having a thickness of from 5 to 10 mm and a size of 3 cm square, the measurement was carried out by an ultrasonic pulse method.

$T_g$: By means of a differential thermal dilatometer and using quartz glass as a reference sample, the rate of elongation of a glass when it was heated at a rate of 5° C./min from room temperature to its yield point, and the temperature corresponding to the critical point in the obtained thermal expansion curve was taken as the glass transition point.

$T_{Str}$: The strain point was measured in accordance with "Determination of annealing point and strain point by fiber elongation" (JIS R 3103-2:2001).

$T_{10}$: A temperature-viscosity curve within a viscosity range of from $10^{1.5}$ dPa·s to $10^{4.5}$ dPa·s was measured with a rotation viscometer. Further, a softening point at which the viscosity becomes $10^{7.6}$ dPa·s was measured in accordance with "Determination of softening point" (JIS R 3103-1:2001), and an annealing point at which the viscosity becomes $10^{13}$ dPa·s was measured in accordance with "Determination of annealing point and strain point" (JIS R 3103-2:2001). A temperature-viscosity curve including these viscosity ranges was obtained by fitting using Fulcher's equation based on the above temperature-viscosity curve, the softening point, the annealing point and the strain point, and $T_{10}$ was obtained from this temperature-viscosity curve.

The fictive temperature $T_f$ was measured by the following method.

First, the above plate glass was processed into a glass plate having a thickness of 0.4 mm and a size of 1 cm square. This glass plate was placed in a box-shaped electric furnace, and the temperature was raised to 630° C. It was maintained at 630° C. for 10 minutes, and then cooled to a holding temperature $T_k$ at a cooling rate of 1° C./min by a program control. After it was maintained at $T_k$ for 140 hours, the sample was retrieved from the electric furnace and quenched to room temperature under the air atmosphere. $T_k$ was set to be 510° C., 500° C., 490° C., 480° C. and 450° C. The thickness of the glass is sufficiently thin, and thus each $T_f$ of the glass becomes $T_k$. The refractive index of each sample was measured, and a calibration curve of $T_f$ and the refractive index was prepared.

Next, the above plate glass was processed into a glass plate having a thickness of 1.2 mm and a size of 4 cm square. The glass plate was placed into a box-shaped electric furnace, and the temperature was raised to 630° C. It was maintained at 630° C. for 10 minutes, and then two types of samples were prepared, for which the cooling rates were set to be 0.1° C./min and 1° C./min, respectively, by a program control (the former is identified as Example 1, the latter as Example 2). The time t's were 1,730 minutes for Example 1 and 173 minutes for Example 2.

The refractive index of each sample was measured, and $T_f$ was obtained using the above calibration curve. The results were 463° C. for Example 1 and 478° C. for Example 2.

Further, the above plate glass was processed into a glass plate having a thickness of 1.2 mm and a size of 4 cm square. This glass plate was flowed through a belt conveyer type electric furnace, and two types of samples i.e. Example 3 and Example 4 were prepared, which have different cooling histories by controlling of the belt velocity. That is, the electric furnace has a length of 3.4 m and has five heaters installed at 0.3 m, 1 m, 1.7 m, 2.4 m and 3 m away from the inlet, and the preset temperatures of the five heaters were set to be, in ascending order of distance from the inlet, 350° C., 450° C., 520° C., 610° C. and 630° C.; and a sample for which the belt velocity was 11 mm/min was identified as Example 3, and a sample for which the belt velocity was 94 mm/min was identified as Example 4. The time t's were 19 minutes 12 seconds for Example 3 and 2 minutes 25 seconds for Example 4.

The refractive index of each sample was measured and $T_f$ was obtained by using the above calibration curve. The results were 497° C. for Example 3 and 513° C. for Example 4.

In the preparation of a sample using such a belt conveyer type electric furnace, there was concern that $T_f$ of a sample varies depending on the position, and thus the glass plate was divided into nine equal parts having a thickness of 1.2 mm and a size of 1.2 cm square, and the refractive index of each part was measured. As a result, it was found that the refractive index of all parts were equal and $T_f$ of all parts have no difference. Further, the center part among the nine parts was divided in the thickness direction into three parts and the refractive index of each part was measured, and it was found that the refractive index of all parts were equal and $T_f$ of all parts have no difference. Thus, it was confirmed that $T_f$ of a glass plate having a thickness of 1.2 mm and a size of 4 cm square is uniform in the whole plate.

$T_f-T_g$ of the Examples were −32° C. for Example 1, −17° C. for Example 2, 2° C. for Example 3 and 19° C. for Example 4, wherein Examples 1 to 3 are Working Examples of the present invention and Example 4 is a Comparative Example. $T_f-T_g$ of a glass plate which is continuously industrially produced by forming a glass into a plate by a float process, a down-draw method or the like and then an annealing step is at least 15° C., and Example 4 is a model of such an industrial product.

For each glass plate of Examples 1 to 4, the five kinds of acid resistance indexes $A_{Si}$, $A_{Al}$, $A_{Li}$, $A_{Na}$ and $A_{Zr}$ (unit: nmol/cm$^2$) were measured as described above. The results are shown in the Table along with the above t.

It is found that t is set to be at least 13 minutes, whereby $A_{Total}$ is decreased and that the decrease of $A_{Li}$ is particularly distinct and the percentage of the decrease reaches 20%. That is, it is found that t is set to be at least 13 minutes, whereby the acid resistance can be improved even if a glass has the same composition.

TABLE 1

| | Ex. 1 | Ex. 2 | Ex. 3 | Ex. 4 |
|---|---|---|---|---|
| | t | | | |
| | 1,730 minutes | 173 minutes | 19 minutes 12 seconds | 2 minutes 25 seconds |
| $A_{Si}$ | 7.9 | 9.2 | 10.3 | 10.5 |
| $A_{Al}$ | 0.8 | 1.8 | 1.8 | 2.0 |
| $A_{Li}$ | 2.2 | 2.7 | 2.7 | 3.4 |
| $A_{Na}$ | 2.9 | 4.4 | 4.3 | 4.9 |
| $A_{Zr}$ | 0 | 0 | 0 | 0 |
| $A_{Total}$ | 13.8 | 18.1 | 19.1 | 20.8 |

INDUSTRIAL APPLICABILITY

The present invention is useful for production of an information recording medium such as a magnetic disk and a glass substrate for an information recording medium.

The entire disclosure of Japanese Patent Application No. 2009-266482 filed on Nov. 24, 2009 including specification, claims and summary is incorporated herein by reference in its entirety.

What is claimed is:

1. A process for producing a magnetic disk, comprising forming a magnetic recording layer on a glass substrate for an information recording medium, wherein the glass substrate for an information recording medium is produced by a process comprising processing a glass formed into a plate by a float process, a down-draw method or a press method, wherein, in cooling of the glass in a last step, a time during which the glass temperature is at most a temperature where a glass viscosity becomes $10^{10}$ dPa·s ($T_{10}$) and is at least its strain point ($T_{Str}$) is at least 13 minutes, wherein the alminosilicate glass comprises from 64 to 67% of $SiO_2$, from 8 to 10% of $Al_2O_3$, from 10 to 13% of $Li_2O$, from 9 to 12% of $Na_2O$, from 0 to 2% of $K_2O$ and from 2 to 4% of $ZrO_2$, provided that the total content of $Li_2O$, $Na_2O$ and $K_2O$, $Li_2O+Na_2O+K_2O$, is from 21 to 25% and wherein the glass substrate has an $A_{Total}$ of at most 20.5 nmol/cm², wherein $A_{Total}$ is the sum of acid resistances $A_{Si}$, $A_{Al}$, $A_{Li}$, $A_{Na}$ and $A_{Zr}$, wherein $A_{Si}$, $A_{Al}$, $A_{Li}$, $A_{Na}$ and $A_{Zr}$ are measured by immersing a glass plate having a thickness of 1 mm and a size of 4 cm square and having both surfaces mirror polished with cerium oxide in 0.01 N nitric acid at 25° C. for 3 hours, followed by eluting the nitric acid to measure the eluted amounts of Si, Al, Li, Na and Zr, and dividing the elution amounts by the surface area of the glass plate to obtain $A_{Si}$, $A_{Al}$, $A_{Li}$, $A_{Na}$ and $A_{Zr}$.

2. The process of claim 1, wherein the alkali alminosilicate glass has an alkali metal oxide content of from 15 to 26 mol %.

3. The process of claim 1, wherein the glass substrate has an $A_{Total}$ of at most 20 nmol/cm².

4. The process of claim 1, wherein the time during which the glass temperature is at most a temperature where a glass viscosity becomes $10^{10}$ dPa·s and at least its strain point is at least 18 minutes.

5. The process of claim 1, wherein a difference obtained by subtracting a glass transition temperature of the glass substrate and a fictive temperature of the glass substrate is at most 5° C.

6. The process of claim 5, wherein the difference obtained by subtracting the glass transition temperature of the glass substrate and the fictive temperature of the glass substrate is at most −10° C.

7. The process of claim 5, wherein the difference obtained by subtracting the glass transition temperature of the glass substrate and the fictive temperature of the glass substrate is at most −25° C.

8. The process of claim 5, wherein the difference obtained by subtracting the glass transition temperature of the glass substrate and the fictive temperature of the glass substrate is at most −35° C.

9. The process of claim 8, where a time during which the glass temperature is at most a temperature where a glass viscosity becomes $10^{10}$ dPa·s ($T_{10}$) and is at least its strain point is at most 1,730 minutes.

10. In a process of forming a magnetic recording layer on a glass substrate suitable as an information recording medium, the improvement comprising producing the glass substrate by a process comprising processing a glass formed into a plate by a float process, a down-draw method or a press method, wherein, in cooling of the glass in a last step, a time during which the glass temperature is at most a temperature where a glass viscosity becomes $10^{10}$ dPa·s ($T_{10}$) and is at least its strain point ($T_{Str}$) is at least 13 minutes, wherein the alminosilicate glass comprises from 64 to 67% of $SiO_2$, from 8 to 10% of $Al_2O_3$, from 10 to 13% of $Li_2O$, from 9 to 12% of $Na_7O$, from 0 to 2% of $K_2O$ and from 2 to 4% of $ZrO_2$, provided that the total content of $Li_2O$, $Na_2O$ and $K_2O$, $Li_3O+Na_2O+K_2O$, is from 21 to 25% and wherein the glass substrate has an $A_{Total}$ of at most 20.5 nmol/cm², wherein $A_{Total}$ is the sum of acid resistances $A_{Si}$, $A_{Al}$, $A_{Li}$, $A_{Na}$ and $A_{Zr}$, wherein $A_{Si}$, $A_{Al}$, $A_{Li}$, $A_{Na}$ and $A_{Zr}$ are measured by immersing a glass plate having a thickness of 1 mm and a size of 4 cm square and having both surfaces mirror polished with cerium oxide in 0.01 N nitric acid at 25° C. for 3 hours, followed by eluting the nitric acid to measure the eluted amounts of Si, Al, Li, Na and Zr, and dividing the elution amounts by the surface area of the glass plate to obtain $A_{Si}$, $A_{Al}$, $Al_{Li}$, $A_{Na}$ and $A_{Zr}$.

11. The process of claim 10, wherein the glass substrate has an $A_{Total}$ of at most 20 nmol/cm².

12. The process of claim 10, wherein the time during which the glass temperature is at least its strain point and at most a temperature where a glass viscosity becomes $10^{10}$ dPa·s is at least 18 minutes.

13. The process of claim 10, wherein a difference obtained by subtracting a glass transition temperature of the glass substrate and a fictive temperature of the glass substrate is at most 5° C.

* * * * *